INVENTOR.
SETH R. GOLDSTEIN
BY
Martin M. Santa
ATTY.

1

3,504,692

PNEUMATIC OSCILLATOR

Seth R. Goldstein, Waltham, Mass., assignor to Massachusetts Institute of Technology, Cambridge, Mass., a corporation of Massachusetts Filed May 31, 1966, Ser. No. 553,983
Int. Cl. F15c *1/08;* G06m *1/12*
U.S. Cl. 137—119 9 Claims

ABSTRACT OF THE DISCLOSURE

A pneumatic oscillator provides a triangular waveform pressure output as a function of time from a constant pressure source. A disk moving back and forth at the frequency of the pressure waveform alternately connects and separates two plenum chambers on each side of the disk. The constant pressure source is connected to one of these plenums through an orifice; the other plenum being connected to the atmosphere through an orifice. The connection of the two plenum chambers for one position of the disk is also restrictive to pneumatic flow from one chamber to the other. The resulting triangular pressure increase and decrease in the source-connected plenum is made available as an output by an external connection to the plenum.

The invention herein described was made in the course of a contract supported by the United States Air Force.

This invention relates to a pneumatic switching device and more in particular to a pneumatic oscillator which produces essentially a triangular waveform of pressure versus time.

In recent years, a great deal of interest has been displayed in pneumatic control systems that do not employ any electrical components. This has been in part due to the increasingly severe environments in which control systems are expected to operate, and the large change of environment that they must tolerate. Additional factors such as high reliability and the ability to utilize the products of combustion of rocket and jet engines have also played a role in stimulating this interest.

Another trend that has been apparent for some time in control systems (as in many other types of systems) is the increasing use of discontinuous on-off type control rather than conventional linear continuous control. Such on-off control systems usually consist of some form of pulse modulation or bang-bang optimal switching.

One of the key elements in a pulsed system is some form of clock that either establishes the pulses or determines when they are going to occur. The clock function is almost invariably performed by an oscillator. Depending on the pulsing scheme that is employed, a pneumatic pulsed system could utilize an oscillator that produces triangle, square or sine waves of pressure versus time. A pneumatic triangle wave oscillator is ideally suited for a pneumatic system that uses pulse length modulation, e.g., constant amplitude pulses whose width can be varied from zero to some maximum width. Needless to say, the use of a pneumatic triangle wave oscillator is not limited to the above application. It can serve as a general purpose triangle wave signal generator for pneumatic systems in much the same way as electrical signal generators are used in electrical systems.

This application presents a new type of pneumatic triangle wave oscillator that utilizes one moving part. A thin disk, e.g., typically dime sized, is caused to shuttle back and forth a short distance, e.g., 0.01 inch, between two dynamically unstable flapper nozzle valves. The resulting on-off modulation of gas flow rates in these valves results in an essentially triangular waveform of pressure versus time. The chief merits of the device are: large range of

2 possible pressure fluctuations and oscillation frequencies that can be obtained with a single device, insensitivity to minute changes in geometry and load flow that plague fluid jet devices, ease of adjustment of oscillation tuning, and existence of a first order analysis and design procedure.

It is therefore an object of this invention to provide a pneumatic triangular wave oscillator having these desirable characteristics.

With the above considerations and object in mind, the invention will now be described in connection with a preferred embodiment thereof given by way of example and not of limitation, and with reference to the accompanying drawings, in which.

Figure 1:
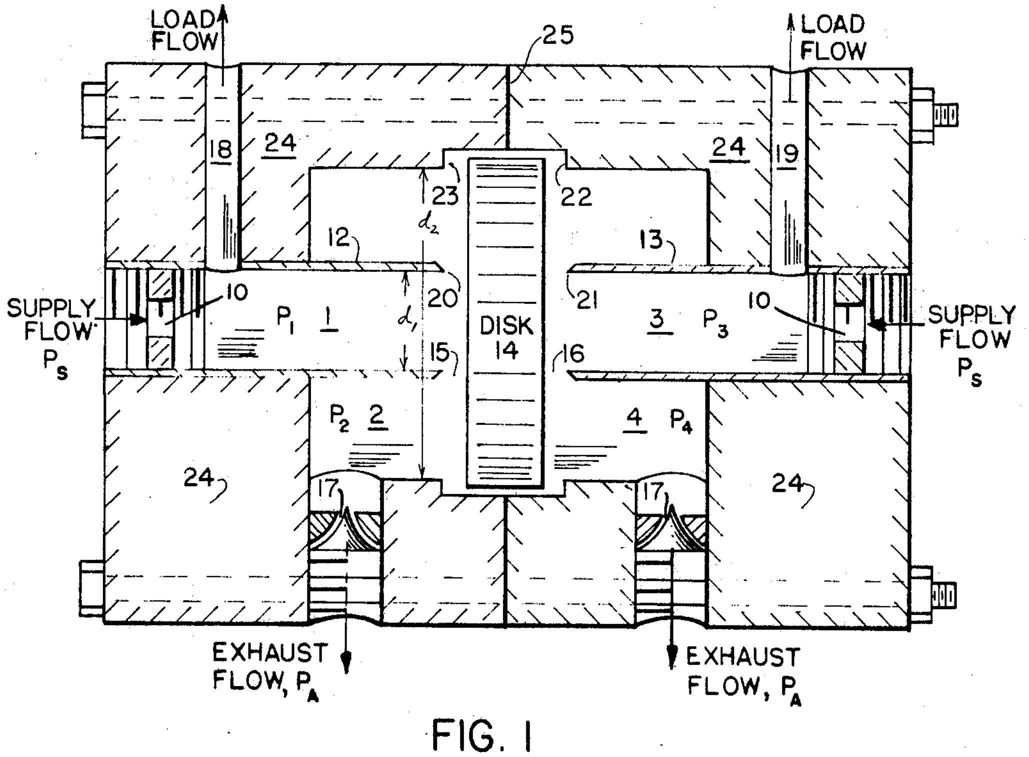
FIG. 1 is a schematic view partly in cross section of a pneumatic triangular pressure wave oscillator.

A schematic cross-sectional view of the oscillator is shown in FIG. 1. The device is symmetric both axially and about a vertical center line. Supply pressure $P_s$ is fed through two fixed orifices 10 of area $A_s$ into two plenum chambers 1, 3 whose pressures are $P_1$ and $P_3$. Each plenum volume $V_1$, $V_3$ is enclosed by a tube 12, 13 whose ends 20, 21 can be sealed off by the freely floating circular disk 14. When the disk 14 is not hard over against a tube end wall 20, 21, flow escapes from the plenum chamber 1, 3 through a circumferential curtain area 15, 16 and goes into a second plenum chamber 2, 4 at pressure $P_2$, $P_4$ from which it exhausts to ambient pressure $P_a$ through a fixed exhaust orifice 17 of area $A_e$. Load flow having a triangular pressure waveform can be taken out of the plenum chambers 1, 3 through tubes 18, 19.

Figure 2:
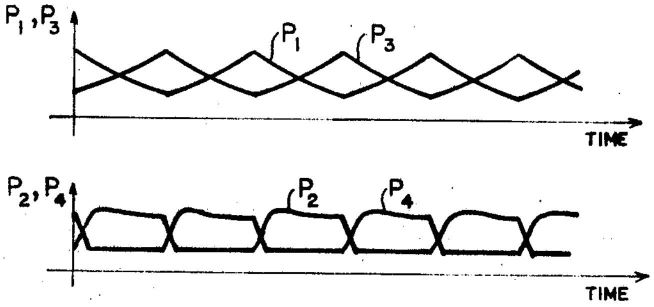
FIG. 2 represents pressure waveforms in the various portions of the oscillator.

The operation of the device may now be understood by referring to the waveforms shown in FIG. 2. Initially assume that the disk 14 is hard over against the end 20 of tube 12 so that only a negligible amount of gas can escape from chamber 1 out through curtain area 15. Pressure $P_1$ is therefore charging up toward the supply pressure $P_S$ from some minimum value, $P_2$ is discharging to ambient since it is receiving negligible flow, $P_3$ is discharging from some peak value, and $P_4$ is above ambient due to the pressure drop at orifice 17. Temporarily, the leftward force exerted by $P_3$ and $P_4$ overcomes the rightward force exerted by $P_1$ and $P_2$ and the disk 14 remains against end 20. A short time later, the force direction is reversed, the disk 14 rapidly moves hard over against the right tube end 21, and $P_3$ begins to build up. At the same time $P_1$ and $P_4$ discharge and $P_2$ rises above ambient. Shortly thereafter the net force on the disk 14 is toward the left, the disk moves back hard over against tube end 20, and the cycle repeats.

The configuration in which the disk is positioned midway between the two tubes must be made statically or dynamically unstable for the above oscillation mode of operation to occur. In addition, flow around the outer periphery of the disk 14 should be small compared to the flows in the curtain areas 15, 16. As is indicated in FIG. 1, the housing shoulders 22, 23 are in line with the tube end walls so that they help support the disk, and provide a sealing surface when the disk is in either of its extreme positions.

It is apparent from the qualitative explanation of the mode of operation of the oscillator of FIG. 1 that the frequency of the oscillation and the maximum and minimum pressure of $P_1$, $P_3$ are determined by the gas supply pressure $P_S$, the gas load flow in tubes 18 and 19, the area and volume of plenum chambers 1, 3, the volume of plenum chambers 2, 4, the mass of disk 14, the pressure drops in orifices 10, 17 and the curtain areas 15, 16. Detailed design equations specifying these quantities when given the desired frequency and pressure variation may be found in the thesis of the inventor, "A New Type of All Pneumatic Pulsed Servomechanism," Massachusetts Institute of Technology, Cambridge, Mass., 1965.

As stated previously, the disk 14 position midway between the tube ends 20, 21 must be unstable if the device of FIG. 1 is to function as a free running oscillator. Ideally, the condition of dynamic instability, which is a sufficient condition, is obtained when the following equation is satisfied.

$$(A_2/A_1)/(V_2/V_1)>1 \qquad (1)$$

$V_1$ is the volume of plenum 1 between orifice 10 and tube end 20 and $A_1$ is $\pi d_1^2/4$. $V_2$ is the volume of plenum 2 between the end 20 and orifice 17 and $A_2$ is $\pi(d_2^2-d_1^2)/4$. Satisfaction of the above relationship will insure dynamic instability unless friction forces between the disk 14 and the housing 24 is excessive. As a general design criteria, the Expression 1 given above should be as much greater than unity as practicable, and the clearance between the disk and the housing should be as small as possible because any flow around the periphery of the disk decreases the dynamic instability.

Interpreting Equation 1 physically, it is seen that the area $A_2$ of plenum chamber 2 should be greater than the area $A_1$ of plenum 1 while the volumes $V_1$, $V_2$ of plenums have the reverse relationship. That this condition is conducive to disk 14 position in stability is made apparent if the operation of the device is again considered just at the moment disk 14 is leaving its leftmost position. At this time the gas pressure on the disk 14 pushing it to the right has just exceeded the leftward acting gas pressure. The gas pressure acting to the right is $P_1A_1+P_2A_2$. In order that the disk continue to move to the right after it starts to leave its leftmost position until it gets to is rightmost position, it is desirable that the gas pressure acting to the right further exceed its initial small excess over the leftward acting gas pressure. As the disk 14 leaves its leftmost position, the pressure $P_1$ is plenum 1 will drop slightly and cause the pressure $P_2$ in plenum 2 to increase slightly. The ratio of change in the pressures $-\Delta P_1/\Delta P_2$ is inverse to their initial volume ratios $V_2/V_1$. The gas pressure acting to the right on the disk changes to $(P_1-\Delta P_1)A_1+(P_2+\Delta P_2)A_2=(P_1A_1+P_2A_2)-\Delta P_1A_1+\Delta P_2A_2$. If $-\Delta P_1A_1+\Delta P_2A_2>0$, the pressure increases as desired. Substituting $-\Delta P_1/\Delta P_2=V_2/V_1$, into this inequality results in Equation 1. Thus, it is seen that if Equation 1 is satisfied, their exists a positive feedback effect (or negative damping effect) on the disk which causes it to have a further positive displacement to either its leftmost or rightmost position once it starts to move toward that position.

Operation of the device is enhanced if the area $A_1$ of plenum chamber 1 is much greater than the curtain area 15 and the area $A_2$ of plenum chamber 2 is greater than the area of exhaust orifice 17 so that significant pressure drops occur only at the discret orifices 15 and 17.

The triangularity of the output pressure waveform will be enhanced if the volume swept by the disk as it translates back and forth is a small fraction of $V_1$.

The frequency of the oscillator is affected to a first order by the volume $V_1$ of chamber 1. Therefore, a convenient method for changing the frequency is to design orifice 10 so that its position along the length of chamber 1 can be conveniently varied as by a screw thread. This method of changing the frequency does not greatly affect the amplitude of the triangular waveform pressure output.

The amplitude of the pressure output is affected to a first order by the area of the exhaust orifice 17. Changing the area of the orifice 17 also affects the frequency of oscillation. Therefore, a convenient method for adjusting the pressure output peak to peak amplitude is to change the area of orifice 17 by a cylindrical ball-valve or needle-valve. The smaller the orifice, the larger the amplitude and the lower the frequency. The amplitude of the pressure output may also be changed by varying the supply pressure $P_S$.

The load flow of gas through output tubes 18, 19 to a utilization device may be a substantial fraction of the supply flow before the device will cease to oscillate. Increasing the loading decreases the amplitude and triangularity of the pressure sawtooth and decreases the frequency.

Since small travel time of the disk 14 is desired in order that higher oscillation frequencies may be achieved, the mass of the disk 14 is preferably as small as possible. Typically, the disk is of aluminum having a thickness of 0.05 inch. In one unit which was tested, the diameter of the disk was five-eighths inch and the spacing between the tube ends 20, 21 was 0.065 inch resulting in a maximum disk travel of 0.015 inch. Preferably, the disk 14 will contact both the shoulders 22, 23 and the tube ends 20, 21 simultaneously to provide a seal at both regions. Only slight degradation of sawtooth pressure linearity is experienced when the disk 14 is in contact with a shoulder but not the tube end so long as curtain area 15 at that time is less than a small fraction of its maximum, e.g. 10%. It has been observed experimentally that the oscillator exhibits greater stability when the tube ends 20, 20 are tapered as in FIG. 1 as compared to the situation where the ends are squared.

The above mentioned oscillator oscillated as expected when the diametral clearance between the disk 14 and housing 24 was 0.005 inch. When this clearance was increased to 0.015 inch, the device ceased to oscillate. Thus it appears that the diametral clearance between disk 14 and housing 24 is limited but does allow reasonable tolerance. Oscillation was achieved with a device when the supply pressure $P_S$ was varied between 50 and 250 p.s.i.a.; frequencies between 50 and 350 cps. were obtained. One unit had a triangular peak to peak pressure output as low as 5 p.s.i. whereas a different unit had fluctuations as large as 75 p.s.i.

It was also experimentally observed that the degree to which the frequency could be adjusted by changing only the charging volume $V_1$, $V_3$ of plenum chambers 1, 3 was governed by the disk travel time. As the frequency was increased, the travel time became a larger fraction of the total period so that the frequency tended to saturate. Typically, the travel time is about 1 millisecond. Increasing the flow rates in a fixed size device will tend to reduce the travel time of the disk. Thus, higher frequencies could be obtained at the expense of increased power consumption.

Figure 3:
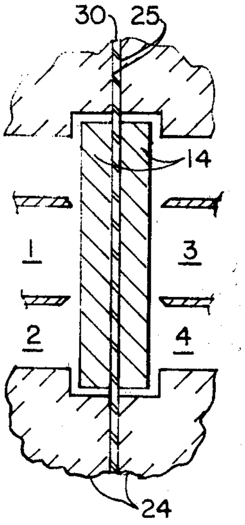
FIG. 3 is another embodiment of the disk used in the embodiment of FIG. 1.

Since flow around the periphery of disk 14 reduces the dynamic instability of the oscillator, this flow is reduced in the embodiment of FIG. 1 by causing the diametral clearance between the disk and the housing to be as small as practicable. Ideally, there should be no flow around the disk since such flow tends to equalize the pressures on both sides of the disk thereby reducing the dynamic instability of the device. An embodiment of the disk which accomplishes this "no-flow" condition is shown in FIG. 3. A flexible diaphragm 30 is secured to the housing 24 at housing junction 25 to produce a barrier between the plenum chambers 1, 2 and plenum chambers 3, 4. This diaphragm may be a thin rubber sheet, at least for low gas temperature operation. The metallic disk 14 may be attached to the diaphragm on one or both sides. The disk of FIG. 3 will result in oscillation being sustained under conditions where it would otherwise have terminated with the disk of FIG. 1.

Other variations of the above-described invention falling within the spirit of the invention will occur to those skilled in the art, and it is intended to include herein all such as fall within the scope of the appended claims.

What is claimed is:

1. A pneumatic oscillator comprising
a housing,
a disk having one of two positions within said housing,
a first and second plenum on each side of said disk,
means for providing a constricted flow of gas from a source of gas pressure into said first plenums,
means for exhausting a constricted flow of gas from said second plenums,
said disk position being responsive to the total pressure provided by each first and second plenum,
one of said first and second plenums being substantially isolated from each other in one disk position and communicating with each other through a constricting-flow curtain area in the other disk position,
the gas pressure in said first plenum increasing during the time said disk position is such that the first and second plenums on the same side of said disk are substantially isolated from each other,
the gas pressure in said first plenum on the other side of said disk decreasing during the time disk position is such that the first and second plenums on said other side communicate with each other,
means for providing external to said housing a small fraction of said time varying pressure of at least one of said first plenums,
said first plenum pressure increases and decreases substantially linearly to produce a substantially triangular pressure as a function of time.

2. The oscillator of claim 1 wherein
said first plenum has a volume $V_1$ and an area $A_1$,
said second plenum has a volume $V_2$ and an area $A_2$,
said areas being the area of the respective plenums covered by said disk when the disk position is such that the first and second plenums are isolated from each other,
said areas and volumes satisfying the relationship $(A_2/A_1)/(V_2/V_1)>1$.

3. The oscillator of claim 1 wherein
said first and second plenums communicate with each other through a curtain area constituting a first orifice,
said first orifice area being much less than the area $A_1$ of said first plenum so that the pressure of the first plenum decreases in a time comparable to that required for the pressure to increase,
said means for constricting the flow of gas from said second plenum is a second orifice between said second plenum and the atmosphere,
said second orifice area being much less than the area $A_2$ of said second plenum.

4. The pneumatic oscillator of claim 3 wherein said means for constricting the flow of gas from a source of gas pressure into said first plenum is a third orifice,
said third orifice area being small to provide a significant pressure drop in the gas flow into said first plenum,
means for controlling the volume of said first plenums whereby the frequency of oscillation is determined.

5. The pneumatic oscillator of claim 4 wherein
said third orifice is capable of being moved into or out of said first plenum to provide said means for controlling the volume of said first plenum.

6. The apparatus of claim 3 wherein
said second orifice area is variable whereby the amplitude of the pressure variation in the first plenum may be controlled.

7. The apparatus of claim 1 wherein
said disk comprises a flexible diaphragm attached to the housing to provide a gas barrier between the plenums on each side of said disk,
said diaphragm being stiffer in that portion adjoint to said first plenum than at the portion attached to said housing.

8. The apparatus of claim 1 wherein
said first plenum has an area much greater than the curtain area so that the pressure of the first plenum decreases in a time comparable to that required for the pressure to increase.

9. The apparatus of claim 1 wherein
said disk housing contains shoulders at each extreme disk position of said disk,
said first plenum comprises a tube having tapered edges at its end nearest said disk,
said shoulder preventing said disk from contacting said tube end,
whereby said disk does not completely isolate said first and second plenums when it is in its closest position to said first plenum.

References Cited

UNITED STATES PATENTS

| | | | |
|---|---|---|---|
| 2,992,652 | 7/1961 | Fellberg | 137—118 |
| 3,151,623 | 10/1964 | Riordan | 137—624.14 X |
| 3,168,898 | 2/1965 | Samet | 137—119 |
| 3,314,439 | 4/1967 | Samet | 137—118 |
| 3,347,252 | 10/1967 | Hansen | 137—82 |

ALAN COHAN, Primary Examiner

U.S. Cl. X.R.

137—624.14; 235—201